United States Patent

Morohoshi et al.

(10) Patent No.: US 7,488,521 B2
(45) Date of Patent: Feb. 10, 2009

(54) RESINOUS TUBE

(75) Inventors: Katsumi Morohoshi, Kanagawa (JP);
Hiroshi Kumagai, Kanagawa (JP);
Tetsuya Enomoto, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/980,313

(22) Filed: Nov. 4, 2004

(65) Prior Publication Data

US 2005/0069702 A1    Mar. 31, 2005

Related U.S. Application Data

(63) Continuation of application No. 10/258,596, filed as application No. PCT/JP02/00316 on Jan. 18, 2002, now abandoned.

(30) Foreign Application Priority Data

Jan. 19, 2001    (JP) ............................. 2001-011517

(51) Int. Cl.
*B29D 22/00* (2006.01)
*B29D 23/00* (2006.01)
*B32B 1/08* (2006.01)

(52) U.S. Cl. .................. 428/36.91; 428/35.7; 428/35.9; 428/36.9; 138/137

(58) Field of Classification Search ............... 428/35.7, 428/35.9, 36.9, 36.91; 138/137
See application file for complete search history.

(56) References Cited

U.S. PATENT DOCUMENTS

| 4,535,901 A | 8/1985 | Okudaira et al. |
| 5,380,571 A | 1/1995 | Ozawa et al. |
| 5,425,817 A | 6/1995 | Mugge et al. |
| 5,469,892 A | 11/1995 | Noone et al. |
| 5,474,109 A | 12/1995 | Stoeppelmann et al. |

(Continued)

FOREIGN PATENT DOCUMENTS

JP    5-164273    6/1993

(Continued)

OTHER PUBLICATIONS

Japanese Industrial Standard, "Adhesion Testing Methods for Rubber, Vulcanized or Thermoplastic," JIS K 6256, 1999, pp. 1-20.

*Primary Examiner*—Michael C Miggins
(74) *Attorney, Agent, or Firm*—Foley & Lardner LLP

(57)    ABSTRACT

A resinous tube which has a low permeability for alcohol-contained fuel in addition to usual gasoline and is sufficiently high in adhesiveness between a barrier layer (permeation-interrupting layer) and a protecting layer (layer covering the permeation-interrupting layer), is easy in reuse of marginal materials and the like, and is a low cost material arrangement is furnished. This resinous tube is formed by laminating pipe-shaped resin layers, in which a main component of at least one layer of layers constituting the tube is a resin such as PBT, PBN, PET, PEN or the like, and a main component of a layer other than the above-mentioned layer is PBT copolymer. The PBT copolymer contains an acid component and a glycol component.

15 Claims, 2 Drawing Sheets

U.S. PATENT DOCUMENTS

| | | | |
|---|---|---|---|
| 6,090,459 | A | 7/2000 | Jadamus et al. |
| 6,294,234 | B1 | 9/2001 | Kertesz |
| 6,576,312 | B1 | 6/2003 | Ito et al. |
| 2002/0082553 | A1* | 6/2002 | Duchamp .............. 604/103.06 |

FOREIGN PATENT DOCUMENTS

| | | |
|---|---|---|
| JP | 6-64102 | 3/1994 |
| JP | 8-90589 | 4/1996 |
| JP | 9-39185 | 2/1997 |
| JP | 10-30764 | 2/1998 |
| JP | 10-166333 | 6/1998 |
| JP | 10-506455 | 6/1998 |
| JP | 10-230556 | 9/1998 |
| JP | 10-327752 | 11/1998 |
| JP | 11-156970 | 6/1999 |
| JP | 11-254626 | 9/1999 |
| JP | 2000-18446 | 1/2000 |
| JP | 2000-55248 | 2/2000 |
| WO | WO 97/04264 | 2/1997 |

\* cited by examiner

RESINOUS TUBE

TECHNICAL FIELD

This invention relates to a resinous tube, and more particularly to the resinous tube which is formed by laminating polyester resin, has a light-weight characteristics, an excellent delamination resistance in a high temperature atmosphere and a high fuel barrier characteristics (fuel non-permeability), and is easy in reuse. Additionally, the resinous tube of the present invention is typically suitably used as a tube for a fuel system piping of an automotive vehicle.

BACKGROUND ART

Hitherto in an automotive vehicle fuel system piping such as a feed tube, a return tube, an evaporation hose, a filler hose and the like, a piping structure which is formed of metal, rubber, resin or a mixture of two or three kinds of these has been used. Particularly recently, one formed of metal and having hitherto served as the mainstream is being replaced with one formed of resin from the viewpoints of no rust being produced, weight-lightening being possible, and being advantageous in cost.

Japanese Patent Provisional Publication No. 5-164273, Japanese Provisional Publication No. 11-156970, Japanese Patent Provisional Publication No. 10-230556, Japanese Patent Provisional Publication No. 10-30764 and Japanese Patent Provisional Publication No. 2000-55248 disclose relating arts.

DISCLOSURE OF INVENTION

However, in general, the piping formed of resin has such a defect as to be inferior in fuel-permeation resistance as compared with one formed of metal. In order to meet a fuel evaporation regulation which is expected to become further strict in the future, it is strongly required to further suppress the permeation.

A variety of developments for the purpose of improving the fuel-permeation resistance of the piping and the like formed of resins have been reported. However, no report has been made for a low cost arrangement which is low in permeability of alcohol-contained fuel and realistic in material and production.

In Japanese Patent Provisional Publication No. 5-164273, proposal is made for an arrangement in which a fluororesin (ethylene-tetrafluoroethylene copolymer) is used for an inner layer (barrier layer), an adhesive layer is disposed for an intermediate layer, and polyamide 12 is used for an outer layer. However, in this case, there are problems in which the fluorine-based resin itself is high in cost, and additionally the adhesive layer for bonding the fluorine-based resin and polyamide 12 as the outer layer is high in cost.

Against this, it has been investigated to thin the layer containing the fluororesin resin in order to suppress a material cost. However, a sufficient thinning is difficult since a sufficient pressure resistance cannot be ensured, so that it is impossible to achieve a cost reduction.

Additionally, in order to obtain a further strong adhesive, there is a case in which fluororesin is extrusion-molded as an inner layer to which surface a chemical treatment liquid containing sodium-ammonia complex is applied thereby making a surface treatment for introducing active groups. However, this extremely complicates the production process while further raising the cost.

In contrast, in Japanese Patent Provisional Publication No. 11-156970 and Japanese Patent Provisional Publication No. 10-230556, an arrangement in which polyphenylene sulfide (PPS) is applied for a barrier layer. However, also in this case, there are problems in which it is necessary to form an adhesive layer, and the PPS layer and the adhesive layer are high in cost. Accordingly, this is difficult to become a combination which is realistic in cost level, similarly to the above-mentioned fluorine-based resin.

In all the cases, these problems result from the fact that the barrier layer and a protecting layer (the outer layer) are respectively formed of different materials. In other words, in case that the different materials are combined with each other, a strong adhesiveness cannot be obtained as it is, and therefore the adhesive layer is required, so that an at least-three layer structure is required. Additionally, there is a defect that the adhesive layer itself is high in cost so that the piping (laminated tube) becomes necessarily high in cost.

Additionally, in Japanese Patent Provisional Publication No. 10-30764 and Japanese Patent Provisional Publication No. 2000-55248, proposal has been made for a method in which a barrier layer (inner layer) and a protecting layer (outer layer) are bonded by a surface treatment such as that using plasma or the like without providing an adhesive layer. However, this complicates the production process and therefore is difficult to become a basic solution to the above problems. Additionally, with such a combination of the different materials, it is extremely difficult to reuse the marginal materials, which becomes a large problem.

This invention has been made in view of the problems in such conventional techniques and intends to provide a resinous tube which has a low permeability for alcohol-contained fuel in addition to usual gasoline and is sufficiently high in adhesiveness between a barrier layer (permeation-interrupting layer) and a protecting layer (layer covering the permeation-interrupting layer), is easy in reuse of marginal materials and the like and is a low cost material arrangement.

The resinous tube according to the present invention is a resinous tube formed by laminating pipe-shaped resin layers, characterized in that a main component of at least one layer of layers constituting the tube is at least one resin selected from the group consisting of PBT, PBN, PET and PEN, and a main component of a layer other than the above-mentioned layer is PBT copolymer.

THE BEST MODE FOR CARRYING OUT THE INVENTION

Hereinafter, a resinous tube according to the present invention will be discussed in detail. A term "%" in the present specification indicates a percent by weight as far as there is no special note.

As discussed above, the resinous tube according to the present invention is formed by laminating pipe-shaped resinous layers. The resinous layers includes at least one layer formed of a material whose main component is polybutylene terephthalate (PBT) copolymer, and at least one of the layers other than the above-mentioned layer is formed of a material whose main component is polybutylene terephthalate (PBT), polybutylene naphthalate (PBN), polyethylene terephthalate (PET) and/or polyethylene naphthalate (PEN), or any combinations of these. The above-mentioned layer whose main component is PBT copolymer is low in permeability of fuel containing alcohol and functions as a permeation-interrupting layer (this layer is referred hereinafter to as a "permeation-interrupting layer"). Additionally, the above-mentioned layer whose main component is PBT, PBN, PET and/or PEN, or any combinations of these functions as a covering layer for covering and protecting the permeation-interrupting layer (this layer is referred hereinafter to as a "covering layer").

Figure 1:
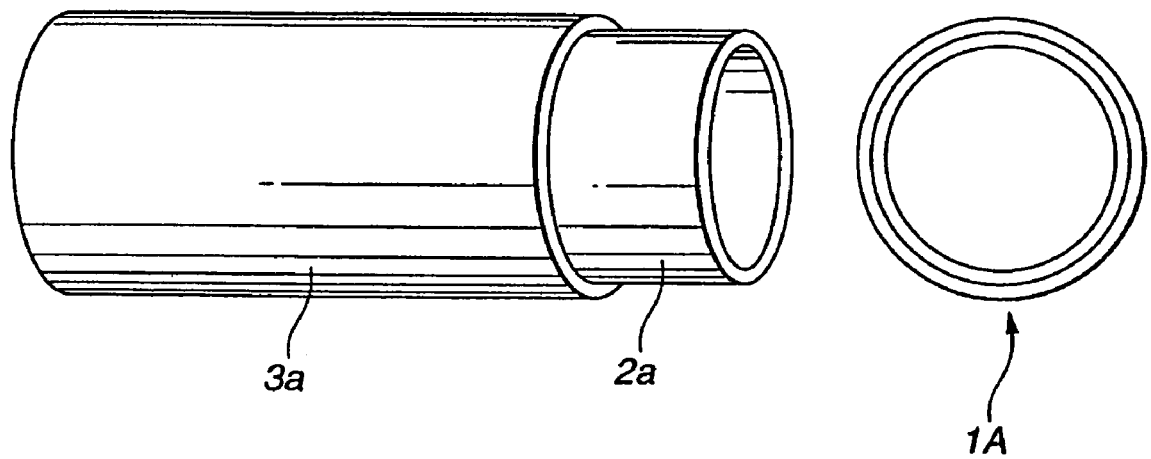
FIG. 1 is a schematic illustration showing an example (two-layer structure) of a resinous tube according to an embodiment of the present invention.
Figure 2:
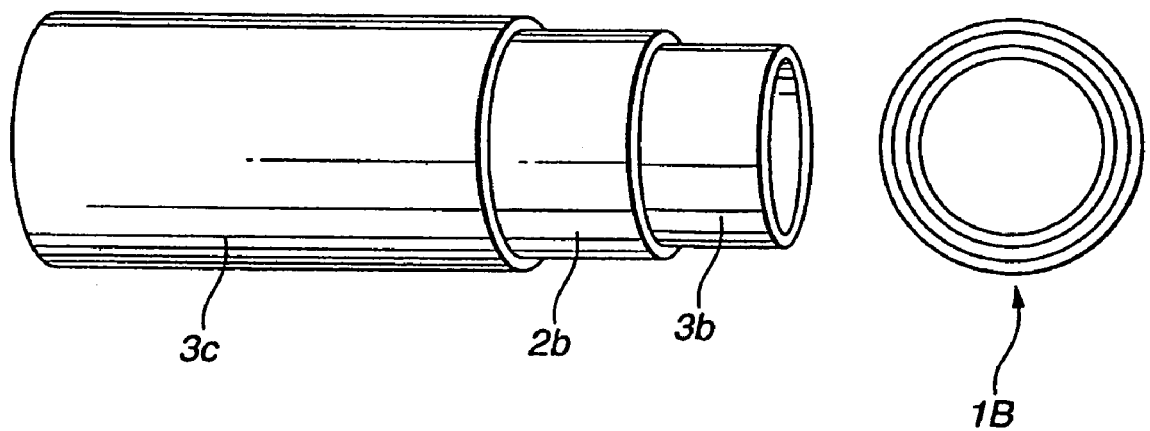
FIG. 2 is a schematic illustration showing an example (three-layer structure) of the resinous tube according to an embodiment of the present invention.
Figure 3:
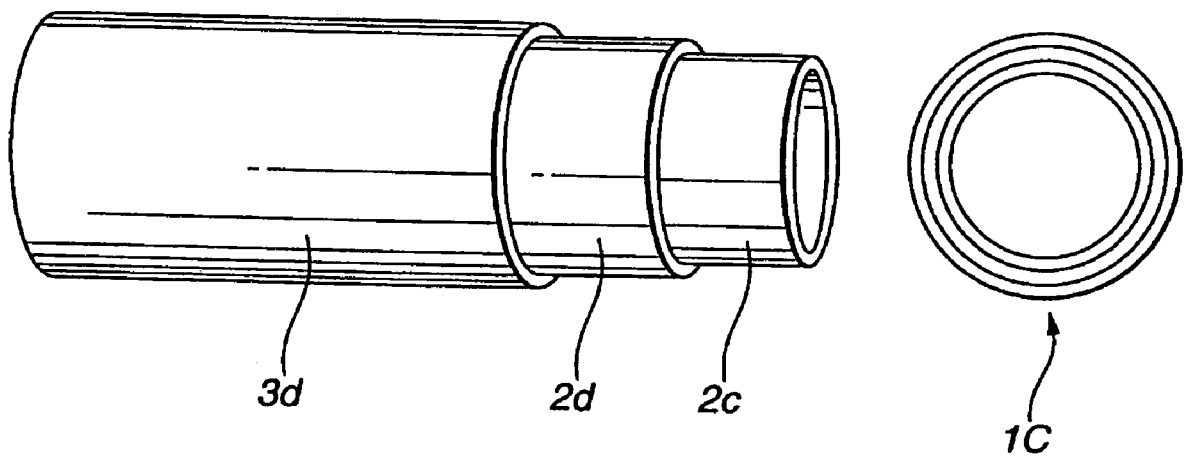
FIG. 3 is a schematic illustration (three-layer structure) of the resinous tube according to an embodiment of the present invention.

In concrete, as shown in FIG. 1, an example is resinous tube 1A which is formed by disposing covering layer 3a at the outer periphery of permeation-interrupting layer 2a formed at its central part with a hollow section through which fuel or the like is flowable. Additionally, as shown in FIG. 2, resinous tube 1B may be formed by disposing covering layer 3b at the inner periphery of a tube having the same arrangement as that of the above-mentioned resinous tube 1A (In FIG. 2, the reference numeral 2b denotes the permeation-interrupting layer, and the reference numeral 3c denotes the covering layer). Further, as shown in FIG. 3, resinous tube 1C may be formed by disposing permeation-interrupting layer 2c different from permeation-interrupting layer 2d at the inner periphery of a tube having the same arrangement as that of the above-mentioned resinous tube 1A (In FIG. 3, the reference numeral 3d denotes the covering layer). It is a matter of course that the resinous tube is not limited to ones having two-layer or three-layer structures, and therefore may be ones which are formed by further laminating a plurality of permeation-interrupting layers and/or covering layers.

Here, PBT, PBN, PET and/or PEN, or any combinations of these may be contained as the main component of the above-mentioned permeation-interrupting layer, by which the resinous tube can have an excellent permeation resistance in case that a mixture fuel containing alcohol such as ethanol or methanol or usual gasoline fuel flows through the inside of the pipe-shaped resinous tube.

Additionally, in either one of a case that the permeation-interrupting layer is in contact with fuel and another case that the covering layer is in contact with fuel, the layers are very low in deterioration with additives even if an amine-based detergent is added as the additives in fuel, because the basic skeleton of the layers is formed of polyester. Furthermore, the layers have a very excellent resistance to sour gasoline (deteriorated gasoline).

Further, both the above-mentioned permeation-interrupting layer and covering layer are remarkably improved, and therefore no slipping tends to occur when the tube is inserted into parts such as joints and metal fittings, similarly in fluorine-contained resins which have been conventionally used.

PBN and PET are slightly high in permeation resistance of fuel or the like in the above-mentioned four resins, and therefore it is more preferable to use them in case that no cost problem occurs.

Furthermore, it may be made to mix, into the above-mentioned permeation-interrupting layer, homopolyester resin such as poly 1,4-cyclohexylene dimethylene terephthalate (PCT), liquid crystal polyester and/or the like, and/or copolymerized polyester having hexane ring such as co-P (ET/CT). In this case, permeation resistance can be further improved.

Furthermore, it may be made to mix, into the above-mentioned permeation-interrupting layer, polyamide resins such as polyamide 6, polyamide 66 and the like, and/or polycarbonate resins such as bisphenol A polycarbonate and the like as far as the compatibility of them with the material of the above-mentioned permeation interrupting layer is not lost. In this case, a further low cost material arrangement can be obtained. Even polypropylene, polystyrene and the like which are incompatible with the material of the above-mentioned permeation-interrupting layer may be mixed into the permeation-interrupting layer similarly to the above-mentioned polyamide resins and the like, if treatment such as epoxy group introduction, maleic acid denaturation or the like is applied to them. Also in this case, a further low cost material arrangement can be obtained.

Additionally, by arranging such that the main component of the above-mentioned covering layer is polybutylene terephthalate (PBT) copolymer, a high miscibility is exhibited at a laminated section between the covering layer and the above-mentioned permeation-interrupting layer. Additionally, even only extrusion of both layers provides a sufficient adhesiveness so that an excellent delamination resistance can be obtained in a high temperature atmosphere.

Further, since no adhesive layer is required between the covering layer and the above-mentioned permeation-interrupting layer, the resinous tube can be obtained at a very low cost.

Furthermore, PBT and/or PET may be mixed in addition to the PBT copolymer, which is effective for further improving the above-mentioned delamination.

Additionally, such PBT copolymer has an excellent flexibility and therefore effectively functions as the covering layer for protecting the above-mentioned permeation-interrupting layer (such as protecting the layer from damaging). Further, since the PBT copolymer has the flexibility, the resinous tube of the present invention can be readily disposed upon being bent, for example, when the resinous tube is installed as a fuel tube to a vehicle or the like. At this time, there is a possibility that the covering layer may contact with a small amount of fuel, it is desirable that the covering layer has a resistance to fuel. The above-mentioned PBT copolymer has PBT in its basic skeleton and therefore has a flexibility required for the covering layer and such a resistance.

Since PBT has a low glass transition point (about 20° C.), it is easy that PBT copolymer obtains a low glass transition point and therefore can obtain an excellent flexibility at a low temperature of −40° C. required in the vehicle or the like. Additionally, it is desirable that the flexibility of the above-mentioned covering layer is such that the flexural elastic modulus at ordinary temperature is not larger than 1.5 GPa. Particularly in case of the resinous tube having an outer diameter $\phi$ of 8 mm and a thickness of about 1 mm, it is desirable that the resinous tube is not larger than 1.0 GPa in flexural elastic modulus at ordinary temperature.

Additionally, the above-mentioned segment in the PBT copolymer may be constituted as either one of block-type (block PBT copolymer) and random type (random PBT copolymer).

In case the above-mentioned PBT copolymer is of the block type, the hard segment is formed of PBT, and the soft segment is formed of polyether such as polytetramethylene glycol, polyhexamethylene glycol and the like, adipic acid ether such as ethylene adipate, butylene adipate and the like, polycaprolactone, polybalerolactone, and polyester such as aliphatic polycarbonate and the like, and the like, from the viewpoints of availability in the market and flexibility at low temperatures.

Typically, it is preferable to use polyester-ether block copolymer elastomer in which PBT is for the hard segment, and polyether is for the soft segment, from the viewpoints of physical properties stability at low to high temperatures, workability and flexibility. Additionally, it is more preferable that the above-mentioned polyether is polytetramethylene glycol.

Additionally, for the similar seasons, it is preferable to use polyester-ester copolymer elastomer in which PBT is for the hard segment, and polyester is for the soft segment. Additionally, it is more preferable that the above-mentioned polyester is polycaprolactone.

In case that the above-mentioned PBT copolymer is of the random type, one of polymerization processes is omitted thereby obtaining a more low cost material arrangement, as compared with a case of being of the block-type.

Typically, the above-mentioned dicarboxylic acid component includes terephthalic acid or ester-formable derivative of terephthalic acid, hydrogenated dimer acid or ester-formable derivative of hydrogenated dimer acid, and any combinations of these. It is preferable to use PBT copolymer containing 1, 4-butanediol as the above-mentioned glycol component. It is desirable that not less than 70 mole % of 1,4-butanediol is used from the viewpoint of raising a molecular weight.

Additionally, dimethyl terephthalate and the like are exemplified as the above-mentioned ester-formable derivative. Further, the above-mentioned hydrogenated dimer acid is obtained by separating unsaturated fatty acid from low polymer by using a viscosity catalyst and being hydrogenated, and after removing products such as trimer acid, monomer acid and the like. At this time, it is desirable that the purity of the hydrogenated dimer acid is not lower than 99%.

In concrete, PRIPOL 1008 (dimer acid having a carbon number of 36 and a ratio of aromatic type/alicyclic type/straight chain aliphatic type=9/54/37 (mole %)) and PRIPOL 1009 (dimer acid having a carbon number of 36 and a ratio of aromatic type/alicyclic type/straight chain aliphatic type=13/64/23 (mole %)) produced by Uniqema are exemplified as suitable examples of the dimer acid. PRIPLAST 3008 (dimethyl ester of PRIPOL 1008) produced by Uniqema, and the like are exemplified as suitable examples of the ester-formable derivative. Additionally, EPOL 1010 produced by Cognis (Henkel) Japan Ltd. is also exemplified.

These hydrogenated dimer acid and/or the ester-formable derivative of the hydrogenated dimer acid may be used singly or in combination.

The copolymer composition of the above-mentioned hydrogenated dimer acid is preferably contained in an amount of not less than 3 mole % in the above-mentioned acid component from the viewpoint of flexibility at low temperatures and in an amount of not more than 30 mole % in the above-mentioned acid component from the viewpoint of workability. Outside this range, a sufficient flexibility cannot be obtained, and a sufficient elasticity (strength) cannot be obtained, after fabrication of the tube. The copolymer composition of the above-mentioned dimer acid is contained more preferably in a rate ranging from 8 to 20 mole %, and more preferably in a rate ranging from 8 to 15 mole %.

As the above-mentioned acid component, aromatic ones and aliphatic ones such as isophthalic acid, 2,6-naphthalene dicarboxylic acid, 4,4'-diphenyl dicarboxylic acid, 4,4'-diphenoxyethane dicarboxylic acid, sebacic acid, adipic acid and the like are exemplified. These may be used suitably in combination.

As discussed above, in either case that the above-mentioned PBT copolymer is of the block type or the random type, it is easy to extrude the resinous tube by using the same cross head because the melting temperatures of the materials of the permeation-interrupting layer and the covering layer are close to each other. Additionally, since there is the miscibility between the permeation-interrupting layer and the covering layer, a high adhesiveness is obtained between the layers.

The constituting materials of the above-mentioned permeation-interrupting layer and the covering layer is not necessary to be particular ones, and therefore materials which are readily available in the market may be used for the constituting materials. Additionally, according to requirements, it may be suitably made to provide the constituting materials with heat resistance and hydrolysis resistance, and to provide the constituting materials with electrical conductivity by mixing filler and the like and to reinforce the constituting materials by mixing inorganic materials and the like.

Additionally, the thickness ratio between the respective layers is not particularly limited, so that the resinous tube may be suitably produced at desired values of the thickness ratio. Particularly, it is preferable that the layer thickness of each of the above-mentioned respective layers is not less than 10% of a whole layer thickness (the thickness of the resinous tube) from the viewpoint of stability during production under-extrusion molding. Additionally, it is preferable that the layer thickness of the covering layer is at a rate ranging from 40 to 90% of the whole layer thickness from the viewpoints of protecting the permeation-interrupting layer and maintaining a suitable flexibility. For example, in case of the hollow tube having a thickness of 1 mm and having a three-layer arrangement as shown in FIG. 2, the hollow tube may take a layer arrangement of 0.1 mm, 0.3 mm and 0.6 mm in the order of from an inner layer side. The outer diameter of the resinous tube is different according to kinds of flowing media, in which the outer diameter is typically within a range of from 3 to about 20 mm.

Further, the resinous tube according to the present invention has a structure formed by laminating the permeation-interrupting layer and the covering layer, and is arranged by combining the materials having the high miscibility. Therefore, not only adhesive is not required during fabrication of the tube but also the resinous tube can be very readily reused.

For example, marginal materials produced during production process and disused fuel tubes can be pulverized and remolten at the same time so as to be reused as desired resinous parts.

Hereinafter, the present invention will be discussed in more detail with reference to Examples and Comparative Examples; however, the present invention is not limited to these Examples.

[Performance Evaluation Method]

Molding was accomplished to form the shape of a laminated multi-layer tube (a single layer only in Comparative Example 2) having a layer arrangement of Examples 1 to 14 and Comparative Examples 1 and 2. A specimen having a width of 1 inch (25.4 mm) was taken from the molded tube and subjected to a 180° peel test according to JIS-K6301.

Additionally, the same material as that of the tube was extruded into a flat plate-shape to form an extruded material which was subjected to a permeation resistance test. Here, regarding the permeation resistance test, using a specimen which was obtained by punching the extruded material into the shape of a disc having a diameter ($\phi$) of 70 mm, a permeation amount after lapse of a prescribed time in the atmosphere of gasoline or alcohol-contained fuel at 60° C. was measured. Results of these are shown in Tables 1, 1-1 and 2.

The gasoline used was regular gasoline which was available in the market. The alcohol-contained fuel used was a mixture of 90 parts by volume of the regular gasoline and 10 parts by volume of ethanol. In Table 1, ◎, ○, Δ and × represent relative evaluations on the basis that the result of Comparative Example is ○, so that ◎ represents the result which is excellent relative to this, ○ represents the result which is equivalent to this, Δ represents the result which is slightly inferior to this, and × represents the result remarkably interior to this.

EXAMPLE 1

PBT resin (PBT 719 produced by Kanebo Gohsen Ltd.) for an inner layer and PBT copolymer (polyester-ether block copolymer elastomer, HYTREL 5577 produced by Du Pont-Toray Co. Ltd.) for an outer layer were extruded at a volume ratio of 3 (PBT resin):7 (PTT copolymer) thereby obtaining a resinous tube (having an outer diameter of 8 mm and inner diameter of 6 mm in an extruded state) and a flat plate (having a thickness of 1 mm) of this Example.

EXAMPLE 2

A procedure similar to that of Example 1 was repeated with the exception that the PBT copolymer for the outer layer was replaced with PBT copolymer (polyester-ester block copolymer elastomer, PELPREN S-6001 produced by Toyobo Co., Ltd.) thereby obtaining the resinous tube and the flat plate of this Example.

EXAMPLE 3

A procedure similar to that of Example 1 was repeated with the exception that the PBT resin for the inner layer was replaced with PBN (TQB-0T produced by Teijin Chemicals Ltd.) thereby obtaining the resinous tube and the flat plate of this Example.

EXAMPLE 4

A procedure similar to that of Example 1 was repeated with the exception that the PBT for the inner layer was replaced with PET (a product having an intrinsic viscosity of 0.75, produced by Takayasu Co., Ltd.) thereby obtaining the resinous tube and the flat plate of this Example.

EXAMPLE 5

A procedure similar to that of Example 1 was repeated with the exception that the PBT for the inner layer was replaced with PEN (produced by Teijin Chemicals Ltd.) thereby obtaining the resinous tube and the flat plate of this Example.

EXAMPLE 6

A procedure similar to that of Example 1 was repeated with the exception that the PBT for the inner layer was replaced with a mixture (having a weight ratio of 60 (PBT):40 (polyester)) of PBT and liquid crystal polyester (VECTRA E130i produced by Polyplastics Co., Ltd.) thereby obtaining the resinous tube and the flat plate of this Example.

EXAMPLE 7

A procedure similar to that of Example 1 was repeated with the exception that the PBT for the inner layer was replaced with a mixture (having a weight ratio of 50 (PBT):50 (PBN)) of PBT and PBN thereby obtaining the resinous tube and the flat plate of this Example.

EXAMPLE 8

A procedure similar to that of Example 1 was repeated with the exception that PBT was extruded for an intermediate layer, and that PBT copolymer (polyester-ether block copolymer elastomer, HYTREL 5577 produced by Du Pont-Toray Co. Ltd.) was laminated as the inner layer at the inner periphery of the intermediate layer so that the volume ratio of the inner layer:the intermediate layer:the outer layer was 1:3:6, thereby obtaining the resinous tube and the flat plate of this Example.

EXAMPLE 9

A procedure similar to that of Example 1 was repeated with the exception that a mixture (having a weight ratio of 50:50) of PBT and PBN was extruded for an intermediate layer, and that PBT copolymer (polyester-ether block copolymer elastomer, HYTREL 5577 produced by Du Pont-Toray Co. Ltd.) was laminated as the inner layer at the inner periphery of the intermediate layer so that the volume ratio of the inner layer: the intermediate layer:the outer layer was 1:3:6, thereby obtaining the resinous tube and the flat plate of this Example. Peel strength was a result measured at an interface between the intermediate layer and the outer layer.

EXAMPLE 10

A procedure similar to that of Example 1 was repeated with the exception that PBN (TQB-0T produced by Teijin Chemicals Ltd.) was extruded as the inner layer, that PBT (PBT 719 produced by Kanebo Gohsen Ltd.) was laminated as an intermediate layer at the outer periphery of this PBN, and that PBT copolymer (polyester-ether block copolymer elastomer, HYTREL 5577 produced by Du Pont-Toray Co. Ltd.) was laminated as the outer layer at the outer periphery of this PBT, so that the volume ratio of the inner layer:the intermediate layer:the outer layer was 1:3:6, thereby obtaining the resinous tube and the flat plate of this Example. Peel strength was a result measured at an interface between the intermediate layer and the outer layer.

EXAMPLE 11

A procedure similar to that of Example 1 was repeated with the exception that PBT copolymer (polyester-ether block copolymer elastomer, Hytrel 2751 produced by Du Pont-Toray Co. Ltd.) was extruded to be laminated as an innermost layer at the inner periphery of PBT for the inner layer, that PBN (TQB-0T produced by Teijin Chemicals Ltd.) was laminated as an intermediate layer at the outer periphery of the PBT, that PBT (PBT 719 produced by Kanebo Gohsen Ltd.) was laminated as the outer layer at the outer periphery of the PBN, and that PBT copolymer (polyester-ether block copolymer elastomer, HYTREL 5577 produced by Du Pont-Toray Co. Ltd.) was laminated as an outermost layer at the outer periphery of the PBT, so that the volume ratio of the innermost layer:the inner layer:the intermediate layer:the outer layer:the outermost layer was 1:1:1:1:6, thereby obtaining the resinous tube and the flat plate of this Example. Peel strengths were results measured at an interface between the intermediate layer and the outer layer and at another interface between the outer layer and the outermost layer.

EXAMPLE 12

A procedure similar to that of Example 1 was repeated with the exception that the PBT copolymer for the outer layer was replaced with random type PBT copolymer which had been produced by a method described below thereby obtaining the resinous tube and the flat plate of this Example.

[Production Method for Random Type PBT Copolymer]

A transesterification vessel was charged with dimethyl terephthalate, hydrogenated dimer acid (PRIPLAS T3008 produced by Uniqema), 1,4-butanediol and tetra-n-butyltitanate as a transesterification and polymerization catalyst, and heated at 210° C. to form methanol which was distilled out from this system, thereby accomplishing transesterification. After the distillation-out of methanol had been almost completed, reaction product was transferred to a polymerization vessel in which a temperature was reached to 250° C. and a pressure was reached to 0.5 mmHg throughout the duration of 1 hour, followed by carrying out polycondensation for the reaction product. Composition including the respective components, sample name and relative viscosity ηrel of the obtained thermoplastic copolymer polyester resin are shown in Table 2.

EXAMPLE 13

A procedure similar to that of Example 1 was repeated with the exception that the PBT copolymer for the outer layer was replaced with a mixture (mixing weight ratio=80 (PBT)/20 (PBT copolymer)) of PBT and the random type PBT copolymer described in Example 12 thereby obtaining the resinous tube and the flat plate of this Example.

EXAMPLE 14

A procedure similar to that of Example 1 was repeated with the exception that the PBT copolymer for the outer layer was replaced with a mixture (mixing weight ratio=60 (PBT)/40 (PBT copolymer)) of PBT and the random type PBT copolymer described in Example 12 thereby obtaining the resinous tube and the flat plate of this Example.

Comparative Example 1

Ethylene tetrafluoroethylene copolymer (ETFE) for an inner layer, a mixture of ETFE and polyamide 12 (PA 12) for an intermediate layer and PA 12 for an outer layer were extruded at a volume ratio of 1.5 (ETFE):1.5 (the mixture):7 (PA 12) thereby obtaining a resinous tube (having an outer diameter of 8 mm and inner diameter of 6 mm in an extruded state) and a flat plate (having a thickness of 1 mm) of this Example. Peel strength was a result measured at an interface between the inner layer and the intermediate layer.

Comparative Example 2

Only polyamide 11 (PA 11) was extruded thereby obtaining a single-layer tube (having an outer diameter of 8 mm and inner diameter of 6 mm in an extruded state) and a flat plate (having a thickness of 1 mm) of this Example.

TABLE 1

| | Material | | | | |
|---|---|---|---|---|---|
| | Innermost layer | Inner layer | Intermediate layer | Outer layer | Outermost layer |
| Compar. Example 1 | — | ETFE | PA12 + ETFE | PA12 | — |
| Compar. Example 2 | — | PA11 | — | — | — |
| Example 1 | — | PBT | — | Polyester-ether block copolymer (PBT · PTMG) | — |
| Example 2 | — | PBT | — | Polyester-ether block copolymer (PBT · PCL) | — |
| Example 3 | — | PBN | — | Polyester-ether block copolymer (PBT · PTMG) | — |
| Example 4 | — | PET | — | ↑ | — |
| Example 5 | — | PEN | — | ↑ | — |
| Example 6 | — | PBT + LCP | — | ↑ | — |
| Example 7 | — | PBT + PBN | — | ↑ | — |
| Example 8 | — | Polyester-ether block copolymer (PBT · PTMG) | PBT | ↑ | — |
| Example 9 | — | ↑ | PBT + PBN | ↑ | — |
| Example 10 | — | PBN | PBT | ↑ | — |
| Example 11 | Polyester-ether block copolymer (PBT · PTMG) | PBT | PBN | PBT | Polyester-ether block copolymer (PBT · PTMG) |
| Example 12 | — | PBT | — | Random copolymer A | — |
| | — | ↑ | — | Random copolymer B | — |
| | — | ↑ | — | Random copolymer C | — |
| Example 13 | — | PBT | — | PBT + random copolymer A = 80/20 | — |
| | — | ↑ | — | PBT + random copolymer B = 80/20 | — |
| | — | ↑ | — | PBT + random copolymer C = 80/20 | — |
| Example 14 | — | PBT | — | PBT + random copolymer A = 60/40 | — |

TABLE 1-continued

| | Material | | | | |
|---|---|---|---|---|---|
| | Innermost layer | Inner layer | Intermediate layer | Outer layer | Outermost layer |
| | — | ↑ | — | PBT + random copolymer B = 60/40 | — |
| | — | ↑ | — | PBT + random copolymer C = 60/40 | — |

TABLE 1-1

| | Extrusion ratio | | | | | Permeation resistance performance | | Peel strength N/m |
|---|---|---|---|---|---|---|---|---|
| | Innermost layer | Inner layer | Intermediate layer | Outer layer | Outermost layer | Gasoline | Alcohol-contained fuel | |
| Compar. Example 1 | — | 0.15 | 0.15 | 0.7 | — | ○ | ○ | 2700 |
| Compar. Example 2 | — | 1.0 | — | — | — | Δ | X | — |
| Example 1 | — | 0.3 | — | 0.7 | — | ○ | ○ | Not peeled |
| Example 2 | — | 0.3 | — | 0.7 | — | ○ | ○ | Not peeled |
| Example 3 | — | 0.3 | — | 0.7 | — | ◎ | ◎ | 4200 |
| Example 4 | — | 0.3 | — | 0.7 | — | ○ | ○ | Not peeled |
| Example 5 | — | 0.3 | — | 0.7 | — | ◎ | ◎ | Not peeled |
| Example 6 | — | 0.3 | — | 0.7 | — | ◎ | ◎ | Not peeled |
| Example 7 | — | 0.3 | — | 0.7 | — | ◎ | ◎ | Not peeled |
| Example 8 | — | 0.1 | 0.3 | 0.6 | — | ○ | ○ | Not peeled |
| Example 9 | — | 0.1 | 0.3 | 0.6 | — | ◎ | ◎ | Not peeled |
| Example 10 | — | 0.1 | 0.3 | 0.6 | — | ◎ | ◎ | Not peeled |
| Example 11 | 0.1 | 0.1 | 0.1 | 0.1 | 0.6 | ◎ | ◎ | Not peeled |
| Example 12 | — | 0.3 | — | 0.7 | — | ○ | ○ | Not peeled |
| | — | 0.3 | — | 0.7 | — | ○ | ○ | Not peeled |
| | — | 0.3 | — | 0.7 | — | ○ | ○ | Not peeled |
| Example 13 | — | 0.3 | — | 0.7 | — | ○ | ○ | Not peeled |
| | — | 0.3 | — | 0.7 | — | ○ | ○ | Not peeled |
| | — | 0.3 | — | 0.7 | — | ○ | ○ | Not peeled |
| Example 14 | — | 0.3 | — | 0.7 | — | ○ | ○ | Not peeled |
| | — | 0.3 | — | 0.7 | — | ○ | ○ | Not peeled |
| | — | 0.3 | — | 0.7 | — | ○ | ○ | Not peeled |

TABLE 2

| | Polymerization composition (mole) | | | | |
|---|---|---|---|---|---|
| Kind of random copolymer | Dimethyl terephthalate | Hydrogenated dimer acid | 1,4-butanediol | Tetra-n-butyltitanate | Relative viscosity ($\eta rel$) |
| A | 80 | 20 | 140 | 0.03 | 1.8 |
| B | 90 | 10 | 140 | 0.03 | 2.2 |
| C | 96 | 14 | 140 | 0.03 | 2.4 |

As apparent from the results shown in Tables 1 and 1-1, all the specimens of Examples 1 to 14 were measured to have excellent characteristics as compared with those of Comparative Examples 1 and 2. Particularly regarding the peel strength, all the specimens other than that of Example 3 did not peel in the peel strength measurement, in which the specimen of Example 3 exhibited a high characteristics as compared with that of Comparative Example 1. Accordingly, it is understood that the materials of the resinous tubes obtained in Examples have an excellent adhesiveness without requiring a special adhesion process.

Although the present invention has been discussed in detail with reference to Examples in the above, the present invention is not limited to these, and therefore a variety of variations may be made within the scope of the present invention.

For example, to the material resins of the respective layers used in the present invention, oxidation inhibitor, thermal stabilizer (for example, hindered phenol, hydroquinone, thioether, and phosphites, or any mixtures of these or substitution products or the like of these), ultraviolet ray absorbent (for example, resorcinol, salicylate, benzotriazole, benzophenone and the like), lubricant or mould releasing agent (for example, silicone resin, montanic acids and salts of these, stearic acids and salts of these, stearyl alcohol, stearyl amide and the like), coloring agent including dye (for example, nitrocine and the like) or pigment (for example, cadmium sulfide, phthalocyanine and the like), additive-impregnated liquid (for example, silicone oil and the like), crystalline nucleus (for example, talc, kaolin and the like), and the like may added singly or in suitable combinations.

Additionally, although the cross-sectional shape of the resinous tube is typically circular shape or elliptical shape, it may be shapes other than these. Further, it is a matter of course that a permeation resistance can be obtained by using the laminate employing the materials of the respective layers in shapes other than the shape of the tube, for example, a shape like that (semicylindrical) of a rain gutter or a sheet-shape. Furthermore, to the resinous tube, blow molding by which production is easier than extrusion molding, provision of corrugation-shape (formation of bellows) and the like may be applied.

The invention claimed is:

1. A fuel transport tube for a vehicle, comprising:
   a plurality of pipe-shaped resinous layers
   wherein at least one of said layers is a permeation interruption layer which consists essentially of at least one resin selected from the group consisting of PBT, PBN, PET and PEN; and
   wherein a layer other than said at least one layer comprises a PBT copolymer and is located farther from fuel than said at least one layer,
   wherein said PBT copolymer comprises a polyester-ether block copolymer elastomer comprising a PBT hard segment and a polyether soft segment, and
   wherein said polyether is polytetramethylene glycol.

2. A fuel transport tube as claimed in claim 1, wherein a layer of said PBT copolymer has a thickness ranging from 40 to 90% of the thickness of all of the layers.

3. A fuel transport tube as claimed in claim 1, wherein a layer of said PBT copolymer has a thickness ranging from 40 to 90% of the thickness of all of the layers, wherein an outer surface of said at least one layer is in tight contact with an inner surface of said layer other than said at least one layer so that no other layer exists between said at least one layer and said layer other than said at least one layer.

4. A fuel transport tube as claimed in claim 1, wherein said PBT copolymer further comprises at least one of PBT and PBN.

5. A fuel transport tube as claimed in claim 4, wherein said PBT copolymer comprises a copolymerized polyester as a primary component, wherein the copolymerized polyester comprises (a) one of (i) a terephthalic acid and (ii) an ester-formable derivative of the terephthalic acid and (b) one of (i) a hydrogenated dimer acid and (ii) an ester-formable derivative of the hydrogenated dimer acid as an acid component, and (c) 1, 4-butanediol as a glycol component.

6. A fuel transport tube as claimed in claim 5, wherein said acid component comprises a copolymer composition of said hydrogenated dimer acid in an amount ranging from 3 to 30 mole %.

7. A fuel transport tube as claimed in claim 4, wherein a layer of said PBT copolymer has a thickness ranging from 40 to 90 % of the thickness of all of the layers.

8. A fuel transport tube as claimed in claim 1, wherein said PBT copolymer comprises a copolymerized polyester as a primary component, wherein the copolymerized polyester comprises (a) one of (i) a terephthalic acid and (ii) an ester-formable derivative of the terephthalic acid and (b) one of (i) a hydrogenated dimer acid and (ii) an ester-formable derivative of the hydrogenated dimer acid as an acid component, and (c) 1,4-butanediol as a glycol component.

9. A fuel transport tube as claimed in claim 8, wherein said acid component comprises a copolymer composition of said hydrogenated dimer acid in an amount ranging from 3 to 30 mole %.

10. A resinous fuel transport tube formed by laminating pipe-shaped resinous layers, said resinous tube comprising:
    a permeation-interrupting layer consisting essentially of one or more resins selected from the group consisting of PBT, PBN, PET and PEN; and
    a covering layer which covers said permeation-interrupting layer, which is formed of a resin which contains a PBT copolymer as a primary component, and which is located farther from fuel than said at least one layer,
    wherein said PBT copolymer comprises a polyester-ether block copolymer elastomer comprising a PBT hard segment and a polyether soft segment formed, and
    wherein said polyether is polytetramethylene glycol.

11. A resinous fuel transport tube as claimed in claim 10, in which an outer surface of said permeation-interrupting layer is in tight contact with an inner surface of said covering layer so that no other layer exists between said permeation-interrupting layer and said covering layer.

12. A resinous fuel transport tube as claimed in claim 11, wherein said PBT copolymer comprises a polyester-ether block copolymer elastomer having a PBT hard segment and a polyether soft segment, wherein said polyether is polytetramethylene glycol, wherein said covering layer formed of said PBT copolymer has a thickness ranging from 40 to 90% of the thickness of all of the layers.

13. A fuel transport tube, comprising:
    a plurality of pipe-shaped resinous layers
    wherein at least one of said layers is a permeation interruption layer which consists essentially of at least one resin selected from the group consisting of PBT, PBN, PET and PEN; and
    wherein a layer other than said at least one layer comprises a PBT copolymer and is located farther from fuel than said at least one layer,
    wherein said PBT copolymer comprises a polyester-ether block copolymer elastomer comprising a PBT hard segment and a polyether soft segment, and
    wherein said polyether is polytetramethylene glycol.

14. A fuel transport system comprising a fuel transport tube having improved fuel permeation interruption properties, the fuel transport tube comprising:
    a plurality of pipe-shaped resinous layers
    wherein at least one of said layers is a permeation interruption layer which consists essentially of at least one resin selected from the group consisting of PBT, PBN, PET and PEN; and
    wherein a layer other than said at least one layer comprises a PBT copolymer and is located farther from fuel than said at least one layer,
    wherein said PBT copolymer comprises a polyester-ether block copolymer elastomer comprising a PBT hard segment and a polyether soft segment, and
    wherein said polyether is polytetramethylene glycol.

15. An automobile comprising a fuel transport system according to claim 14.

* * * * *